(12) United States Patent
Engelsma et al.

(10) Patent No.: US 8,386,260 B2
(45) Date of Patent: *Feb. 26, 2013

(54) METHODS AND APPARATUS FOR IMPLEMENTING DISTRIBUTED MULTI-MODAL APPLICATIONS

(75) Inventors: Jonathan R. Engelsma, Hudsonville, MI (US); Anuraj Kunnummel Ennai, Bangalore (IN); James C. Ferrans, Wheaton, IL (US)

(73) Assignee: Motorola Mobility LLC, Libertyville, IL (US)

( * ) Notice: Subject to any disclaimer, the term of this patent is extended or adjusted under 35 U.S.C. 154(b) by 765 days.

This patent is subject to a terminal disclaimer.

(21) Appl. No.: 12/336,768

(22) Filed: Dec. 17, 2008

(65) Prior Publication Data

US 2009/0171669 A1 Jul. 2, 2009

(30) Foreign Application Priority Data

Dec. 31, 2007 (IN) .......................... 2768/DEL/2007

(51) Int. Cl.
*G10L 21/00* (2006.01)
(52) U.S. Cl. .................................... 704/270.1; 704/275
(58) Field of Classification Search .................. 704/257, 704/270.1, 275
See application file for complete search history.

(56) References Cited

U.S. PATENT DOCUMENTS

| | | | |
|---|---|---|---|
| 6,185,535 B1 * | 2/2001 | Hedin et al. .................. 704/270 |
| 6,269,336 B1 * | 7/2001 | Ladd et al. .................... 704/270 |
| 6,633,846 B1 * | 10/2003 | Bennett et al. ................ 704/257 |
| 6,785,654 B2 * | 8/2004 | Cyr et al. .................. 704/270.1 |
| 7,003,462 B2 | 2/2006 | Shambaugh et al. |
| 7,016,845 B2 * | 3/2006 | Vora et al. .................. 704/270.1 |
| 7,200,559 B2 * | 4/2007 | Wang ............................. 704/257 |
| 7,809,575 B2 * | 10/2010 | Ativanichayaphong et al. ............................. 704/270 |
| 7,945,851 B2 * | 5/2011 | Cross et al. .................... 715/223 |
| 2002/0161587 A1 * | 10/2002 | Pitts et al. ..................... 704/276 |
| 2003/0167172 A1 | 9/2003 | Johnson et al. |
| 2003/0182622 A1 * | 9/2003 | Sibal et al. .................... 715/511 |
| 2004/0128136 A1 * | 7/2004 | Irani .......................... 704/270.1 |
| 2004/0220810 A1 * | 11/2004 | Leask et al. ................. 704/270.1 |

(Continued)

FOREIGN PATENT DOCUMENTS

WO 03071422 A1 8/2003
WO 2004006131 A1 1/2004

OTHER PUBLICATIONS

PCT/US2008/087802 Search Report; Dated Jun. 26, 2009; 11 pages.

(Continued)

*Primary Examiner* — Talivaldis Ivars Smits
*Assistant Examiner* — Shaun Roberts

(57) ABSTRACT

Embodiments of a system include a client device (102), a voice server (106), and an application server (104). The voice server is distinct from the application server. The client device renders (316) a visual display that includes at least one display element for which input data is receivable though a visual modality and a voice modality. The client device may receive speech through the voice modality and send (502) uplink audio data representing the speech to the voice server over an audio data path (124). The application server receives (514) a speech recognition result from the voice server over an application server/voice server control path (122). The application server sends (514), over an application server/client control path (120), a message to the client device that includes the speech recognition result. The client device updates (516) one or more of the display elements according to the speech recognition result.

20 Claims, 6 Drawing Sheets

U.S. PATENT DOCUMENTS

2006/0036770 A1     2/2006   Hosn et al.
2006/0080391 A1     4/2006   Mumich et al.
2006/0146728 A1     7/2006   Engelsma
2006/0235694 A1   10/2006   Cross et al.
2006/0248207 A1*   11/2006   Olson et al. .................. 709/230

OTHER PUBLICATIONS

Russan Patent and Trademark Office, "Notification on Results for Estimation of Patentability of Invention", Russian Application No. 2412-169389RU/8132, Nov. 16, 2012, 4 pages.

* cited by examiner

METHODS AND APPARATUS FOR IMPLEMENTING DISTRIBUTED MULTI-MODAL APPLICATIONS

TECHNICAL FIELD

The inventive subject matter generally relates to distributed applications, and more particularly to distributed multi-modal applications implemented in a client-server system environment.

BACKGROUND

A user interface "modality" may be defined as a mode of interaction between a user and an electronic device, where the interaction is implemented through the device's user interface. A user interface modality may be implemented through a combination of hardware and software associated with a particular type of human perceptible information (e.g., information perceptible by sight, sound or touch) and/or human-generated information (e.g., information generated through speech or other physical action). For example, one type of user interface modality is a "visual modality," which may be implemented through a display screen and associated hardware and software for generating visual displays on the display screen. A visual modality also may be implemented using various input devices that facilitate user interaction with a visual display, such as input devices that enable the user to select information that is rendered in the visual display (e.g., using a scrolling mechanism, touchscreen or arrow keys), to enter information into fields of the visual display (e.g., using a keypad), and/or to change the focus of the visual display from one field to another. Another type of user interface modality is a "voice modality," which may be implemented using a microphone, speaker, and associated hardware and software adapted to receive and digitize human speech, and/or to output audio information (e.g., audio prompts or other audio information). Other types of user interface modalities include, for example, gestural modalities, and pen modalities, to name just two.

In the interest of providing improved usability over "single-modality" devices, many electronic devices include a "multi-modal" user interface, which is a user interface that provides more than one user interface modality. For example, an electronic device may provide both a visual modality and a voice modality. Such a device may, for example, simultaneously output visual information (e.g., displayed information) and associated audio information (e.g., audio prompts), and/or the device may enable a user to input information via speech, a keypad or both, as the user desires. Generally, a device having a multi-modal user interface provides an improved user experience, because the user may choose the modality with which he or she will interact with the device. Interaction using a voice modality may be desirable, for example, in situations in which the user desires hands-free interaction, such as when typing is too time-consuming and/or when the user is impaired either permanently (e.g., due to arthritis or some other physical disability) or situationally (e.g., when the user is wearing gloves and/or when the user's hands are occupied with other tasks). In contrast, interaction using a visual modality may be desirable, for example, in situations in which complex information is to be rendered, when auditory privacy is desired, when noise restrictions exist, and/or when there are auditory constraints either permanently (e.g., when the user has a heavy accent, a speech impediment, and/or a hearing impairment) or situationally (e.g., when there is significant background noise or noise restrictions).

A multi-modal user interface may be implemented in conjunction with an application that operates in a networked environment (e.g., a client-server system environment). In such a case, the user interacts with the multi-modal user interface on a client device (e.g., a cellular telephone or computer), and the client device communicates with one or more other devices or platforms (e.g., a server) over a network. In such a networked environment, two basic techniques have been implemented to design client-server system elements that support a multi-modal user interface, and more particularly system elements that support a user interface adapted to provide at least visual and voice modalities. Using an "embedded" technique, substantially all of the requisite hardware and software associated with the multiple modalities are included in the client device itself. For example, the client device may include software and hardware adapted to perform audio-related tasks, such as speech processing, speech recognition, and/or speech synthesis, among other things. Generally, such audio-related tasks necessitate special processors or processing engines (e.g., digital signal processors) and substantial amounts of memory (e.g., for storing tables and software associated with the audio-related tasks). Using a "distributed" technique, some of the processing associated with one or more of the modalities may be shifted to another processing element, such as a remote server. For example, when a user speaks, audio data may be sent from the client device to a remote server, and the remote server may perform some or all of the audio-related tasks and return data, error messages, and/or processing results to the client device.

Each technique has its advantages and disadvantages. For example, an advantage to some conventional distributed techniques is that some of the computationally intensive processes associated with a multi-modal user interface (e.g., audio-related tasks) may be shifted out of the client device to another processing element (e.g., a remote server), as just mentioned. Accordingly, the client device may not include special processors or processing engines (e.g., digital signal processors) and extra memory for implementing the tasks that are displaced from the client device. This means that the client device may be designed in a more cost-effective manner (e.g., the device may be designed as a "thin" client) than client devices that implement an embedded technique.

However, using conventional distributed techniques, the states of the various modalities need to be synchronized between the client and the server. Consistent synchronization between the states of multiple modalities is difficult to achieve across a network. More particularly, using conventional distributed techniques, synchronization between a visual modality and a voice modality may be unreliable due to latencies inherent in the network communications, among other things. For example, when a user verbally provides an input for a data entry field, the client device sends data reflecting the verbal input to the server and waits for a speech recognition result to be returned by the server before the visual display can be updated to display the speech recognition result. In some cases, updating the visual display to reflect the verbally provided input may not occur in a sufficiently timely manner, and the visual and voice modalities may become unsynchronized. In addition, implementation of a multi-modal user interface using conventional distributed techniques typically is performed using non-standard protocols and unconventional content authoring techniques. Accordingly, such techniques have not been readily embraced by the majority of carriers or application designers.

Accordingly, what are needed are multi-modal user interface methods and apparatus that may facilitate thin client designs and the use of standard protocols and conventional content authoring techniques, and that may overcome the synchronization issues inherent in conventional distributed techniques. Other features and characteristics of the inventive subject matter will become apparent from the subsequent detailed description and the appended claims, taken in conjunction with the accompanying drawings and this background.

BRIEF DESCRIPTION OF THE DRAWINGS

The inventive subject matter will hereinafter be described in conjunction with the following drawing figures, wherein like numerals denote like elements.

DETAILED DESCRIPTION

Embodiments include methods and apparatus for implementing distributed multi-modal applications. These embodiments may facilitate the use of standard protocols and conventional content authoring techniques, and also may overcome synchronization issues inherent in some conventional distributed techniques. In addition, these embodiments may be used in conjunction with "thin client" types of devices.

As used herein, the term "multi-modal" means adapted to implement multiple user interface modalities. The terms "distributed multi-modal application," "multi-modal application," and "distributed application" may be used interchangeably to mean a software application that provides a multi-modal user interface on a client device (e.g., client device 102, FIG. 1), and which includes distinct components that are executed in separate runtime environments on different platforms (e.g., client device 102, application server 104, and/or voice server 106, FIG. 1), where the different platforms are interconnected through a network (e.g., network 108, FIG. 1).

Figure 1:
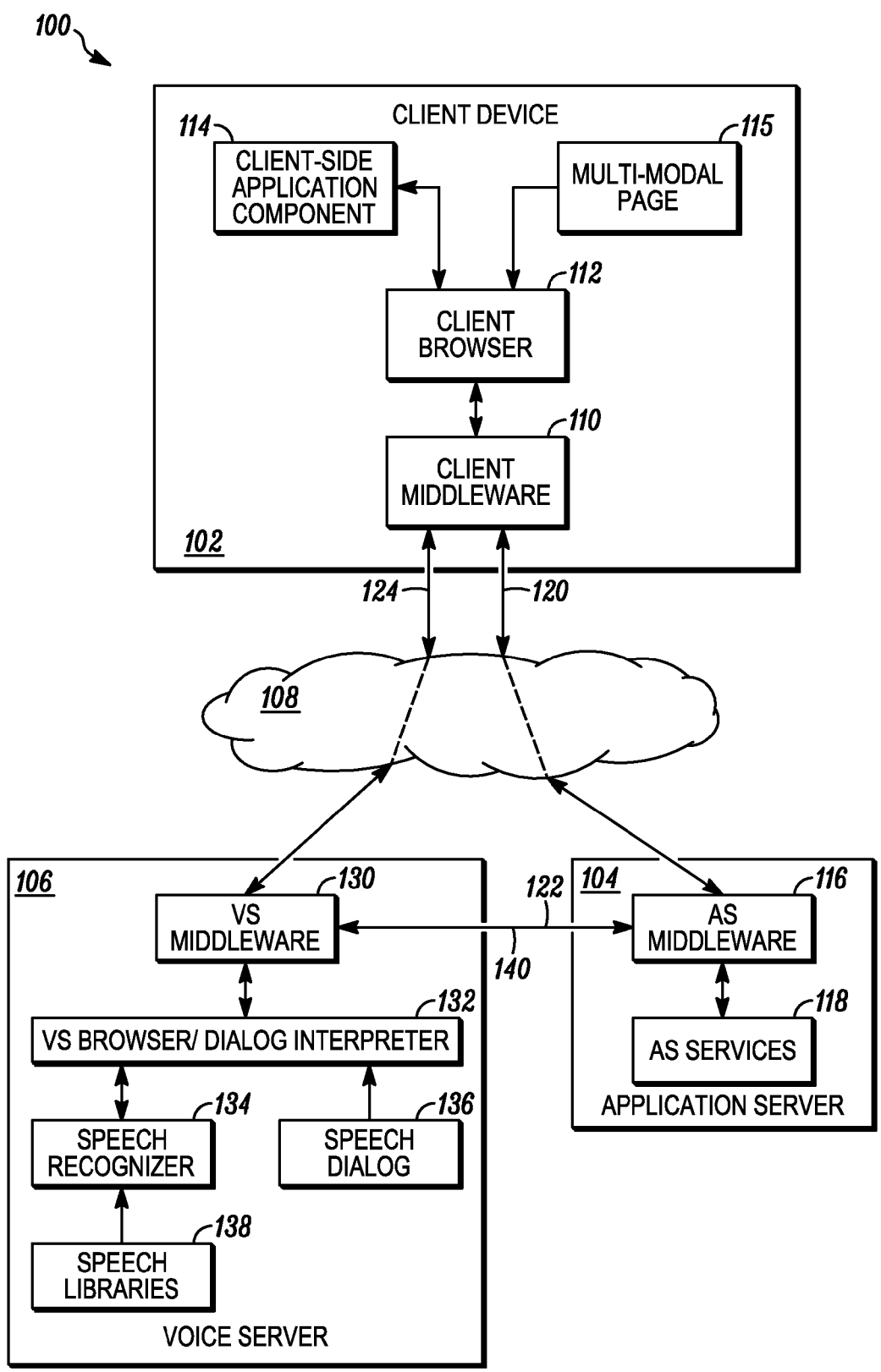
FIG. 1 is a simplified diagram of a system adapted to implement distributed multi-modal applications, in accordance with an example embodiment.

In an embodiment, distributed multi-modal applications are adapted to be executed in a system having a client-server system architecture (e.g., system 100, FIG. 1). As used herein, the terms "client" or "client device" may be used interchangeably to mean a processing entity, electronic device or application, which is adapted to execute software associated with a distributed multi-modal application (e.g., a client browser and/or a client-side application component). In addition, a client device is adapted to access, via a network, one or more services that are associated with the distributed multi-modal application, and that are provided by one or more remote servers.

The term "server" means a processing entity, electronic device or application that performs services for one or more network-connected clients or other servers in response to client-issued or server-issued requests. The terms "application server" and "AS" mean a server adapted to initiate establishment of data and control links associated with a distributed multi-modal application session, and to control synchronization between various "views" associated with the application session. The term "modality server" means a server adapted to execute a server-side application component that is associated with one or more user interface modalities. The terms "voice server" and "VS" mean a modality server that is specifically adapted to execute a server-side application component associated with a voice modality. Although the description, below, includes detailed descriptions of a system in which a voice server is included to support a voice modality, it is to be understood that other types of modality servers that support other types of user interface modalities additionally or alternatively may be included in a system, in other embodiments (e.g., a gestural modality, pen modality, and so on).

A particular example of a distributed multi-modal application will be used throughout this description in order to facilitate understanding of the example embodiments. It is to be understood that the illustrative example is not to be taken as limiting the scope of the embodiments only to that example. In the example embodiment, a distributed multi-modal application is adapted to support a visual modality and a voice modality. A client device includes a "multi-modal enabled" browser and/or a client-side application component, either or both of which is adapted to interpret machine code that causes the client device to render a visual display that includes at least one display element for which input data is receivable by the client device though a visual modality and a voice modality. In an embodiment, the machine code is included within and/or referenced by a multi-modal page which, when interpreted, causes the client device to render multiple user-interactive display elements (e.g., data input fields for city, state, street number, and street name).

As used herein, the term "interpret" means to interpret and/or execute, as those terms are understood to those of skill in the art. The term "machine code," as used herein, means markup (e.g., markup drafted in standard generalized markup language (SGML), extensible markup language (XML), hypertext markup language (HTML), extensible HTML (XHTML), dynamic HTML (DHTML), VoiceXML, speech application language tags (SALT), scalable vector graphics (SVG), and/or various other markup languages), scripts (e.g., JavaScript code), compiled code (e.g., compiled C/C++, Java, Lisp, Fortran, Pascal, and so on), and/or other information, which may be readily executed or interpreted by a computer processor (e.g., client device 102, application server 104, and/or voice server 106, FIG. 1).

Referring again to the example multi-modal application discussed herein, a user of the client device may enter information for a display element on which the application is currently "focused" (e.g., the element that is selected or in which the cursor is blinking), and/or may change the focus (e.g., by selecting another element). In an embodiment, the user may enter information for a display element using either a visual modality or a voice modality, as the user desires. When the user enters information using the keypad of the client device, for example, that action corresponds to entry of data using the visual modality, and the information will be rendered as text in the data entry field upon which the visual view is focused. Upon submitting the information (e.g., by pressing "enter" or moving the cursor), the visual display may be updated to reflect a different focus.

Alternatively, the user may enter information using the voice modality (e.g., the user may speak a city name). When this occurs, the client device sends audio data representing the speech to a voice server over an audio data path, in an embodiment. The voice server is adapted to execute a speech recognizer, in an embodiment, which evaluates the received audio data in light of a speech dialog that corresponds to the machine code (e.g., the multi-modal page or code associated with a client-side application component) being interpreted by the client device. The speech recognizer may generate a speech recognition result (or an error), which the voice server may convey to the client device via the application server, in an embodiment. The client device may then render the speech recognition result as text in the corresponding data field, and the states of the voice view and the visual view may be updated and synchronized, according to various embodiments. When the states of the voice view and the visual view are synchronized, the portion of the speech dialog being interpreted by the voice server corresponds to the portion of the machine code being interpreted by the client device.

As will be described in detail below, embodiments include methods for synchronizing the visual view and the voice view in light of a user's ability to enter information using either modality. This may be consistently achieved, in various embodiments, even though the state of the visual view is maintained on a client device, and the state of the voice view is maintained on a voice server. Synchronization may be achieved using standard protocols and conventional content authoring techniques, although in new ways, thus facilitating and encouraging the development of a wide variety of distributed multi-modal applications.

FIG. 1 is a simplified diagram of a system 100 adapted to implement distributed multi-modal applications, in accordance with an example embodiment. System 100 includes a plurality of system entities, which include at least one client device 102, application server 104 (AS), and voice server 106 (VS), in an embodiment. As will be explained in detail below, various data and control paths are established between these system entities, and various communication protocols are observed by the system entities, in order to support the implementation of a distributed multi-modal application session within the system 100. As used herein, the term "multi-modal application session" may be defined as an instance of a distributed multi-modal application. In an embodiment, a multi-modal application session includes the interpretation (e.g., execution and/or interpretation) of machine code (e.g., machine code associated with client-side application component 114 and/or a group of one or more related multi-modal pages 115) by a client device 102 in conjunction with the interpretation of a group of one or more corresponding speech dialogs by a voice server 106.

Although only one client device 102 is illustrated, system 100 may include a plurality of similar or different types of client devices. For example, a client device 102 may form a portion of an electronic device selected from a group of devices that includes, but is not limited to, a cellular telephone, a radio, a pager, a personal data assistant (PDA), a personal navigation device (PND), a mobile computer system (e.g., an automotive or airplane computer system), a computer (e.g., a laptop, notebook or desktop computer), and a voice over internet protocol (VoIP) phone implemented on a computer, to name a few.

Client device 102 includes a processing subsystem and a data storage subsystem, and may be a portable or stationary electronic device. For either type of device, client device 102 may include a battery subsystem adapted to provide energy in the event that line power is not used to power client device 102. Client device 102 may be adapted to communicate over one or more networks 108 using various wired and/or wireless communication technologies. Accordingly, client device 102 may include either or both wired and wireless network interfaces. Client device 102 also may include a variety of user interface input devices (e.g., keypad, keys, dials, touchscreen, microphone, pointing device (e.g., mouse or touchpad), and stylus) and a variety of user interface output devices (e.g., display screen, speaker, audio output jack, headphones, earbuds, mechanical vibration device). In an embodiment, user interface devices associated with a visual modality include any one or more devices selected from a group of devices that includes a visual display, a touchscreen, a keypad, a key, a dial, a pointing device, and a stylus. User interface devices associated with a voice modality include any one or more devices selected from a group of devices that includes a microphone, a speaker, an audio output jack, headphones, and earbuds, in an embodiment.

In an embodiment, client device 102 is adapted to execute one or more instances of client middleware 110, a client browser 112, and/or a client-side application component 114. As used herein, the term "middleware" means computer software that provides interfaces between software components and/or applications running on distinct processing entities (e.g., clients, servers, or other processing entities). In an embodiment, client middleware 110 is adapted to provide an interface between the client browser 112 and/or client-side application component 114 and one or more servers (e.g., application server 104 and voice server 106) across network 108.

Client browser 112 is adapted to access machine code (e.g., multi-modal page 115) on the client device 102 in conjunction with the client-side application component 114, and further to interpret the machine code. In a particular embodiment, client browser 112 is adapted to access at least one multi-modal page 115, and to interpret the machine code (e.g., markup, scripts, and other information) within the multi-modal page 115. As used herein, the term "multi-modal page" means an information set that represents at least one user-interactive display element that may be visually represented on client device 102, and for which a user may input information and/or indicate a selection through any of multiple modalities (e.g., a voice modality and a visual modality). Multi-modal page 115 may include, for example but not by way of limitation, a web page, a document, a file, a form, a list or another type of information set. When interpreted, multi-modal page 115 may cause client device 102 to render one or more user-interactive display elements. As used herein, a "user-interactive display element" may include, for example but not by way of limitation, a text entry field, a selectable element (e.g., a button or checkbox), and/or interactive text, among other things. Along with one or more user-interactive display elements, a multi-modal page may include other information and/or elements, as well, such as textual information, images (e.g., static or animated images), audio information, video, hyperlinks, metadata, and scripts, for example.

In an embodiment, multi-modal page 115 includes markup, which may cause client browser 112 and/or client-side application component 114 (or other syntactic analysis software) to execute one or more embedded or referenced scripts (e.g., JavaScript code). A script may be embedded within multi-modal page 115 or the script may be referenced within multi-modal page 115, and client browser 112 and/or client-side application component 114 may access the script from an external source (e.g., a server) or from local memory (e.g., from cache on the client device 102). In an alternate embodiment, a script may be embedded or referenced within client-side application component 114, rather than multi-modal page 115. In an embodiment, a script may be adapted to cause client device 102 to issue an asynchronous request to application server 104 for a variety of purposes, as will be described in detail later in conjunction with FIGS. 2-6. In the below description, when client device 102 is said to send a control message to application server 104, this may be interpreted as client device 102 issuing an asynchronous request to application server 104, in many cases. Similarly, when application server 104 is said to send a control message to client device 102, this may be interpreted as application server 104 issuing a response to an asynchronous request previously sent by client device 102. In an embodiment, the asynchronous requests are issued as asynchronous hypertext transfer protocol (HTTP) requests, and the responses are HTTP responses.

A client-side application component 114 and/or a multi-modal page 115 may be developed using AJAX (Asynchronous JavaScript and extensible markup language (XML)) techniques, and accordingly may include XML markup and JavaScript adapted to issue asynchronous requests (e.g., asynchronous HTTP requests) and to process responses (e.g., HTTP responses) to those requests, in an embodiment. In other embodiments, client-side application component 114 and/or a multi-modal page 115 may be developed using other types of programming, scripting, and/or markup languages.

As used herein, the term "markup language" means a defined set of syntax rules for information (e.g., markup or other machine code) that is embeddable within an information set (e.g., a multi-modal page 115 or other machine code), and which indicates, to a syntactic analysis software (e.g., client browser 112 and/or client-side application component 114), the structure, layout, and/or other characteristics of display elements (e.g., text or other content) when the elements are rendered on an electronic device, among other things. For example, but not by way of limitation, markup associated with a markup language may include presentation markup, procedural markup, and/or descriptive markup (also referred to as "semantic" markup). Markup languages that may be used in various embodiments include, but are not limited to, SGML, XML, HTML, XHTML, DHTML, VoiceXML, SALT, SVG, and various other markup languages.

Client browser 112 includes a software program that is adapted to perform syntactic analysis of the machine code (e.g., markup) within a multi-modal page (e.g., multi-modal page 115) and/or to interface with client-side application component 114 in a manner that enables client device 102 to render text, images, videos, music, and/or other information represented or referenced within the machine code and/or the client-side application component 114. In various embodiments, client browser 112 may include, but is not limited to, an HTML/XHTML browser, a wireless application protocol (WAP) browser, a custom application, and/or a commercially-available browser (e.g., Internet Explorer, Mozilla Firefox, Safari, Opera, and Netscape, to name a few). In a particular embodiment, client browser 112 is an XHTML browser, which supports JavaScript execution and HTTP network communications, and which also has audio handling capabilities. Client browser 112 is "multi-modal enabled," in an embodiment, meaning that client browser 112 is adapted to interpret machine code associated with multimodal applications.

Client-side application component 114 includes a computer software application. In an embodiment, client-side application component is coded in a browser-supported language (e.g., SGML, XML, HTML, XHTML, DHTML, or other markup languages), and is reliant upon the client browser 112 to render the application component executable. In other embodiments, client-side application component 114 may not be reliant upon a client browser 112 to render the application component executable. A plurality of different types of client-side application components 114 may be developed, including for example, application components associated with mapping applications, navigation applications, and searching applications, to name a few.

Client device 102 may communicate with application server 104 and voice server 106 over one or more networks 108. A network 108 may include, for example, a packet switched network and/or a circuit switched network, and may more particularly include one or more of the Internet, a personal area network (PAN), a local area network (LAN), a wide area network (WAN), a Wideband LAN (WLAN), a cellular telephone network, a radio network, a satellite communications network, a public switched telephone network (PSTN), and/or any of a variety of other types of networks adapted to enable the interchange of information between various system entities. Network 108 may be adapted to exchange information between the system entities using any of a variety of wired or wireless communications protocols.

Application server 104 (AS) is adapted to perform various services for client device 102. In an embodiment, application server 104 is adapted to execute one or more instances of AS middleware 116 and AS services 118, as will be described in more detail below. In an embodiment, AS middleware 116 is adapted to provide an interface with the voice server 106 and the client device 102 across server-to-server connection 140 and network 108, respectively.

In an embodiment, AS services 118 include session communication establishment software, which is adapted to initiate the establishment of various data and control paths 120, 122, 124 between client device 102, application server 104, and voice server 106, in conjunction with a multi-modal application session. The data and control paths associated with a multi-modal application session may include, for example, AS/client control path 120, AS/VS control path 122, and VS/client audio data path 124. In an embodiment, client device 102 and application server 104 may exchange information via AS/client control path 120, and client device 102 and voice server 106 may exchange information via VS/client audio data path 124, where at least portions of AS/client control path 120 and VS/client audio data path 124 are established over the one or more networks 108. Application server 104 and voice server 106 may exchange information via AS/VS control path 122, at least a portion of which is established over server-to-server connection 140, which may include direct, hardwired links or which may be implemented through one or more wired or wireless networks or other intermediate entities.

In an embodiment, control messages exchanged between client device 102 and application server 104 in conjunction with a multi-modal application session are exchanged over a network 108, using a message communication protocol appropriate for network 108. Accordingly, network 108 functions as a control path between client device 102 and application server 104. This control path is referred to herein in a singular sense as the AS/client control path 120, even though a defined routing path may not be dedicated through the network 108 for the session, and the physical routing, through network 108, of each message exchanged between client device 102 and application server 104 may be different from message to message. Accordingly, as used herein, a "AS/client control path" may be defined to mean any one or more paths through network 108 (or some other communication medium) along which messages may be exchanged between an IP address and/or port associated with client device 102 and an IP address and/or port associated with application server 104. Similarly, an "AS/VS control path" may be defined to mean any one or more paths (which may or may not traverse a network) between an IP address and/or port associated with application server 104 and an IP address and/or port associated with voice server 106. Additionally, a "VS/client audio data path" may be defined to mean any one or more paths through network 108 (or some other communication medium) along which audio data may be exchanged between an IP address and/or port associated with voice server 106 and an IP address and/or port associated with client device 102. In an embodiment, the AS/client control path 120 and the VS/client audio data path 124 are distinct from each other, in that the client IP address and/or port allocated, during a session, for the AS/client control path 120 is different from the client IP address and/or port allocated, during the session for the VS/client audio data path 124. In addition, the application server IP address and/or port allocated to the AS/client control path 120 is different from the voice server IP address and/or port allocated to the VS/client audio data path 124, which is the case because application server 104 and voice server 106 are distinct from each other.

As mentioned previously, machine code associated with multi-modal pages rendered on client device 102 and/or client-side application components executed on client device 102 are adapted to issue asynchronous requests (e.g., asynchronous HTTP requests), which are received by application server 104 over AS/client control path 120. AS services 118 are adapted to perform processing and/or other tasks in accordance with the requests, and to return responses (e.g., HTTP responses) to the client device 102 over AS/client control path 120, as appropriate. In addition, through control messages communicated via AS/client control path 120 and AS/VS control path 122, AS services 118 are adapted to control the synchronization between the states of the visual view maintained on client device 102 and the voice view maintained on voice server 106. Essentially, synchronization of the visual view and the voice view includes providing information to the client device 102 and voice server 106, which enable interpretation of machine code on the client device 102 to be synchronized with interpretation of machine code for a corresponding speech dialog 136 on the voice server 106. Said another way, synchronization of the visual view and the voice view includes providing information to the client device 102 and to the voice server 106, which enables the execution state of the visual view on the client device 102 to be synchronized with the execution state of the voice view on the voice server 106. Embodiments of methods for performing this synchronization will be described in more detail later.

Voice server 106 is a modality server, which is particularly adapted to perform speech processing related tasks in conjunction with a distributed multi-modal application session. As mentioned previously, other types of modality servers may be incorporated into a system, in other embodiments. Voice server 106 is adapted to execute one or more instances of VS middleware 130, a VS browser/dialog interpreter 132 (referred to below as VS browser 132), and a speech recognizer 134. Speech recognizer 134 may be considered a VS-side application component, as it forms a server-side portion of a distributed application. In other embodiments, other types of VS-side application components may be implemented.

VS middleware 130 is adapted to provide an interface between the VS browser 132 and other servers (e.g., the application server 104) and/or client device 102 across server-to-server connection 140 and/or network 108, respectively. VS browser 132 is a software program that enables voice server 106 to access and interpret speech dialogs (e.g., speech dialog 136), to send and receive audio data in conjunction with interpreting the speech dialogs, to issue asynchronous requests (e.g., asynchronous HTTP requests), and to receive and process responses (e.g., HTTP responses) in the context of a multi-modal application session. In various embodiments, VS browser 106 may include, but is not limited to, a custom or commercially available browser or other application adapted to interpret markup associated with the provision of a voice modality (e.g., VoiceXML, SALT, and/or various other markup languages).

As just mentioned, VS browser 132 may access and interpret a speech dialog 136. As used herein, a "speech dialog" may be interpreted to mean an information set associated with a set of possible speech recognition results and/or audio prompts. A speech dialog may include machine code adapted to collect and/or provide audio data (e.g., speech prompts) in one or more stages, according to various embodiments. A speech dialog may include, for example but not by way of limitation, a web page, a document, a file, a list or another type of information set. A speech dialog also may include other information and/or elements, such as textual information, metadata, machine code, and scripts, for example. Although embodiments described below include speech dialogs that are accessed (e.g., downloaded) by voice server 106, it is to be understood that, in other embodiments, a speech dialog may be realized as machine code that is resident on voice server 106, and that does not need to be downloaded or otherwise accessed.

In an embodiment, speech dialog 136 includes machine code, where the machine code may include compiled code, markup, and/or other information, which may be readily interpreted by the voice server 106. In a particular embodiment, speech dialog 136 may include markup, which causes VS browser 132 to access and/or execute one or more embedded or referenced scripts (e.g., JavaScript code). A script may be embedded within speech dialog 136, or VS browser 132 may access a script from an external source (e.g., a server) or from local memory (e.g., from cache on the voice server 106). The scripts may include scripts adapted to call speech recognizer 134 to attempt to determine a speech recognition result based on received audio data, to retrieve or generate an audio prompt, and/or to issue asynchronous requests (e.g., asynchronous HTTP requests for speech dialogs or other types of requests), among other things. Speech dialog 136 may be developed using AJAX techniques, and accordingly may include markup (e.g., VoiceXML and/or SALT markup) and JavaScript adapted to issue asynchronous requests, in an embodiment. In other embodiments, speech dialog 136 may be developed using other types of programming languages, scripting languages, and/or markup languages.

Speech recognizer 134 is a software application that may be invoked by VS browser 132, and that is adapted to receive audio data (e.g., in compressed, uncompressed, encoded, unencoded or decoded format), to execute a speech recognition algorithm using the audio data in order to attempt to determine a speech recognition result (e.g., an indication of recognized speech), and to return the speech recognition result or to indicate that no result was determined. As used herein, the term "audio data" means a digitized representation of speech or other audible sounds (generally "audio"), where the digitized audio representation may include sampled speech or other audible sounds in a compressed, uncompressed, encoded, unencoded, and/or decoded format. Audio data also may include pointers into tables or other data structures that include audio data, where the tables may be accessible to application server 102, voice server 106, and/or client device 102. Speech recognizer 134 may be executed in conjunction with one or more speech libraries 138 or other speech recognition resources (e.g., grammars, n-gram sequences, statistical language models or other speech recognition resources), where the speech recognition resources may be accessed based on the particular speech dialog 136 being interpreted.

In an embodiment, voice server 106 communicates with application server 104 via AS/VS control path 122. In addition, voice server 106 and client device 102 may directly exchange audio data via VS/client audio data path 124. In an embodiment, audio data may be streamed over VS/client audio data path 124 using a packet-data communication protocol. Alternatively, audio data may be exchanged over VS/client audio path 124 using circuit-switched or push-to-talk (PTT) communication methods. In an embodiment, audio data is communicated over VS/client audio data path 124 using a version of the real-time transport protocol/real-time transport control protocol (RTP/RTCP), although other protocols may be implemented, in other embodiments (e.g., transmission control protocol (TCP) or others).

Application server 104 and voice server 106 are distinct from each other, in that application server 104 and voice server 106 perform distinct processes, and exchange control messages that affect the performance of those processes over AS/VS control path 122. In addition, AS/client control path 120 between client device 102 and application server 104 is distinct from VS/client audio data path 124 between client device 102 and voice server 106, at least in that the client device 102 addresses application server 104 and voice server 106 using different addresses (e.g., different IP addresses). In addition, client device 102 may exchange control messages with application server 104 using a different communication protocol from that used to exchange audio data with voice server 106. In an embodiment, application server 104 and voice server 106 may be implemented on physically distinct hardware, which may or may not be co-located. In another embodiment, application server 104 and voice server 106 may be implemented on at least partially shared hardware, although the various control messages still are exchanged between the two servers through the AS/VS control path 122, as described in detail below.

As mentioned previously, embodiments of the inventive subject matter are adapted to synchronize a visual view and a voice view associated with a distributed multi-modal application session. The state of the "visual view" is maintained by client device 102, in conjunction with interpretation of a multi-modal page (e.g., multi-modal page 115), and the state of the "voice view" is maintained by voice server 106, in conjunction with interpretation of a speech dialog (e.g., speech dialog 136) associated with the multi-modal page. The terms "visual view" and "visual view state" may be defined to be the machine code included or accessed within a multi-modal page that a browser (e.g., client browser 112) currently is interpreting or is waiting to interpret and/or the machine code included or accessed within a client-side application component that is currently being executed. For example, the current visual view state may correspond to machine code associated with a single page element on which the visual display currently is focused, which may be represented on the visual display as the page element that is highlighted, at which the cursor is blinking, or at which some other indication of focus is set. The terms "voice view" and "voice view state" may be defined to be the machine code included or accessed within a speech dialog that a browser (e.g., VS browser 132) currently is executing or is waiting to execute. For example, the current voice view state may correspond to machine code that causes the voice server to wait to receive audio data as input for a display element that is being rendered on client device 102.

Embodiments of methods for initiating and conducting a multi-modal application session now will be described in conjunction with FIGS. 2-6. These embodiments will be described in the context of an example of a specific type of distributed multi-modal application, in order to facilitate explanation and understanding of the various embodiments. The example application is a mapping application, which includes a client-side application component that is adapted to cause elements represented within a multi-modal page to be rendered on the client device through interpretation by a client browser. The client-side application component (e.g., the mapping application) and the client browser are "multi-modal enabled," meaning that they are each adapted to support a user interface that recognizes and/or provides user interaction using multiple modalities, and the client browser in particular is adapted to understand and exchange messages with one or more remote servers in support of a distributed multi-modal application session. In an alternate embodiment, a client browser may be adapted to interpret a multi-modal page without initiation from a client-side application component (e.g., when the user directly initiates an instance of a client browser and causes the client browser to download and interpret a multi-modal page). In still another alternate embodiment, a client-side application component may perform some or all of the client browser tasks, and/or the client-side application component may include some or all of the machine code that otherwise would be included within a multi-modal page. Accordingly, embodiments may be performed with or without a multi-modal page. These embodiments are not discussed in detail herein, although it is to be understood that they fall within the scope of the inventive subject matter.

The example will include a client device displaying a multi-modal page in the form of a data input form, where the data input form includes multiple, fillable data entry fields (e.g., city, state, street number, street address), into which a user may enter address information for a target location using either or both a visual modality or a voice modality. Upon submitting the entered information, the system may provide mapping information that enables the client device to display a map that includes the target location. It is to be understood that embodiments may be used in conjunction with other types of distributed multi-modal applications, as well (e.g., searching and navigation applications, among others).

In the given example, the multiple modalities include a visual modality and a voice modality. On the client device, the visual modality may be implemented using a display screen and associated hardware and software for generating visual displays. The visual modality also may be implemented on the client device using a keypad and/or one or more other user interface input devices, which enable a user to make selections, input information, and/or take other actions (e.g., change focus) through interaction with the visual display and/or other user interface input devices. The voice modality may be implemented on the client device using a microphone, a speaker, and associated hardware and software adapted to receive and digitize human speech, and/or to output audio information.

In the given example, a user may interact with the visual modality of the user interface (e.g., the visual display) by viewing the visual display and entering information into fields of the visual display (or making selections) using the keypad or other input devices. In addition, the user may interact with the voice modality of the user interface by listening to audio prompts and/or speaking in order to provide information associated with page elements on which the focus of the visual display is set. It is to be understood that, in alternate embodiments, a distributed multi-modal application may be adapted to enable a different set of modalities than a visual modality and a voice modality.

Figure 2:
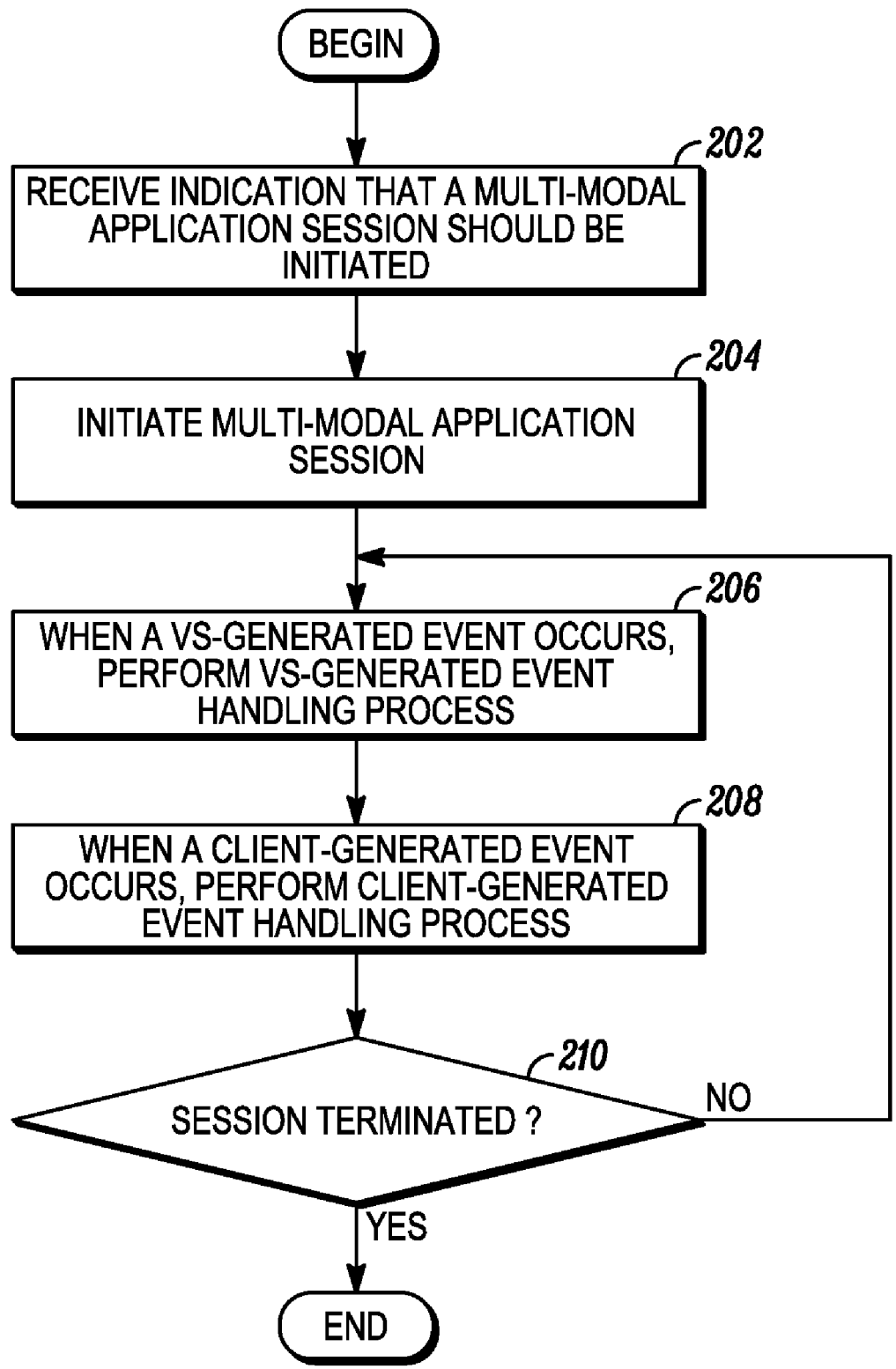
FIG. 2 is a flowchart of a method for initiating and conducting a multi-modal application session, in accordance with an example embodiment.

FIG. 2, which will be described below, illustrates an overall process for initiating and conducting a multi-modal application session, in accordance with an embodiment. The intention for FIG. 2 is not to limit the scope of the inventive subject matter, but instead to provide an overall context for understanding the more detailed process descriptions illustrated and described in conjunction with FIGS. 3, 5, and 6.

FIG. 2 is a flowchart of a method for initiating and conducting a multi-modal application session, in accordance with an example embodiment. The method may begin, in block 202, when a client device receives an indication that a multi-modal application session should be initiated. In various embodiments, a multi-modal application session may be initiated by an instance of a client-side application component (e.g., a client-side portion of a mapping application) and/or a client browser. For example, a user of the client device may initiate an instance of a client-side application component that is adapted to render, either by itself or in conjunction with a client browser, a visual display that includes at least one display element for which data may be entered using a visual modality or a voice modality. Alternatively, the user may initiate an instance of a client browser, and may indicate, to the client browser, the user's desire for the browser to access or download a multi-modal page which, when interpreted, causes the client device to render the visual display. For example, the user may provide user inputs to navigate to a multi-modal page.

Upon the client device receiving an indication that a multi-modal application session should be initiated, the multi-modal application session is initiated, in block 204, through interaction between the client device, an application server, and a voice server, as will be described in greater detail in conjunction with FIG. 3. Initialization of the multi-modal application session includes the establishment of an audio data path (e.g., VS/client audio data path 124, FIG. 1) between the client device and the voice server, over which audio data will be exchanged during the multi-modal application session. In addition, in and embodiment, initialization of the multi-modal application session includes the exchange of information between the client device and the application server over a first control path between the client device and the application server (e.g., AS/client control path 120, FIG. 1), and the exchange of information between the application server and the voice server over a second control path between the application server and the voice server (e.g., AS/VS control path 122, FIG. 1).

As will be described in greater detail in conjunction with FIGS. 5 and 6, during the multi-modal application session, audio data will be exchanged between the client device and the voice server over the audio data path, and control information will be exchanged between the client device, the application server, and the voice server over the first and second control paths. The control information enables synchronization between the states of the visual view and the voice view to be maintained consistently throughout the session.

Audio data and control information are exchanged between the various system entities in response to events generated by the voice server and the client device, which events are referred to respectively as "VS-generated events" and "client-generated events." VS-generated events and client-generated events may affect the states of voice view and/or the visual view. VS-generated events and client-generated events may occur at various times as the multi-modal application session is being conducted. As will be described in greater detail in conjunction with FIG. 5, when a VS-generated event occurs, a VS-generated event handling process is performed in block 206. In addition, as will be described in greater detail in conjunction with FIG. 6, when a client-generated event occurs, a client-generated event handling process is performed in block 208. Although blocks 206 and 208 are illustrated as occurring in sequence, these processes also may occur in parallel or in opposite sequence, and either or both process may occur multiple times while a multi-modal application session is being conducted. Until the multi-modal application session is terminated, as depicted by block 210, the processes of handling VS-generated events and client-generated events continue to be performed, as illustrated in FIG. 2.

Figure 3:
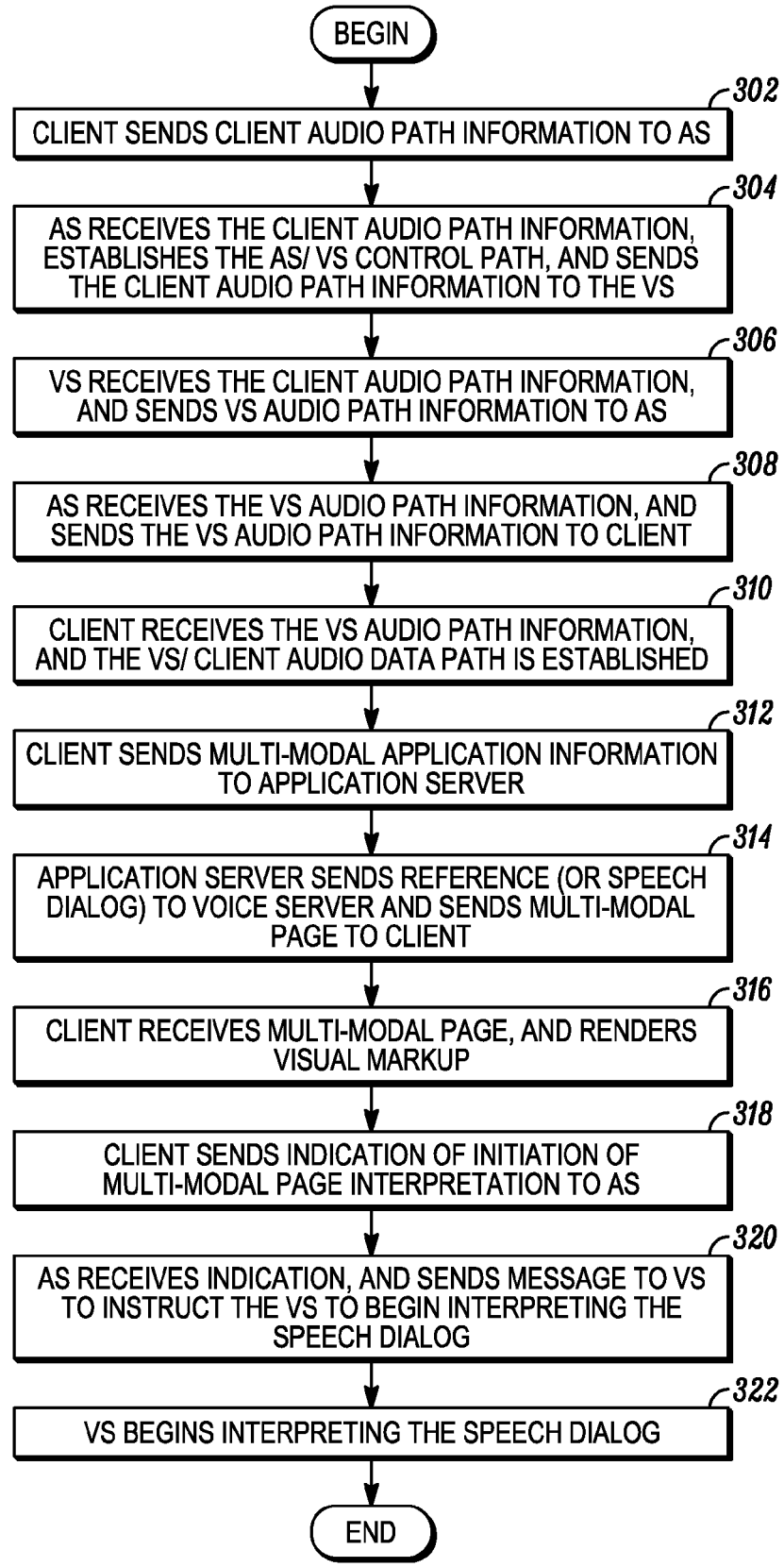
FIG. 3 is a flowchart of a method for performing multi-modal application session initiation, in accordance with an example embodiment.

FIG. 3 is a flowchart of a method for performing multi-modal application session initiation (e.g., process 204, FIG. 2), in accordance with an example embodiment. As described previously in conjunction with process 202 of FIG. 2, a multi-modal application session may be initiated when a client device receives an indication that a multi-modal application session should be initiated, in an embodiment. For example, a multi-modal application session may be initiated when a user initiates a client-side application component or browser adapted to interpret or execute machine code that causes the client device to render one or more display elements for which data may be entered using a visual modality, a voice modality or both. In an embodiment, a multi-modal application session may be initiated when a user initiates a client-side application component or a browser adapted to interpret a multi-modal page, and/or when the user selects a hyperlink to a multi-modal page, among other actions.

In block 302, the client device sends, over the AS/client control path (e.g., AS/client control path 120, FIG. 1), one or more control messages to an application server, which include client audio path information, where the client audio path information specifies descriptive characteristics relating to the audio data path (e.g., VS/client audio data path 124, FIG. 1) that the client device would like to have established with a voice server. For example, the client audio path information may include, but is not limited to, information describing the audio format(s), bitrate(s), and/or audio type(s) supported by the client-side application component and/or the client browser, desired audio codec(s), and/or client-side audio address information such as the client device IP address and the port number to be used for audio data downloaded to the client device over the audio data path during the multi-modal application session (referred to herein as "downlink audio data"). In another embodiment, prior to sending the client audio path information to the application server, the client device may send an application initiation message to the application server over the AS/client control path. The application initiation message may include, for example, an application identifier, client credentials, and/or other information.

In block 304, the application server receives the client audio path information sent by the client device, and initiates establishment of the audio data path (e.g., VS/client audio data path 124, FIG. 1) between the client device and the voice server. In an embodiment, this includes the application server establishing the AS/VS control path (e.g., AS/VS control path 122, FIG. 1) with a voice server. The application server then sends, over the AS/VS control path, one or more control messages to the voice server, which includes some or all of the client audio path information.

In block 306, the voice server receives and stores the client audio path information sent by the application server. The voice server then sends, over the AS/VS control path, one or more control messages to the application server, which includes VS audio path information. In an embodiment, the VS audio path information specifies additional descriptive characteristics relating to the VS/client audio data path. For example, the VS audio path information may include, but is not limited to, audio format(s), bitrate(s), and/or audio type(s) supported by the voice server, desired audio codec(s), and/or VS-side audio address information such as the voice server IP address and the port number to be used for audio data uploaded to the voice server over the VS/client audio data path during the multi-modal application session (referred to herein as "uplink audio data").

In block 308, the application server receives the VS audio path information sent by the voice server. The application server then sends, over the AS/client control path, one or more control messages to the client device, which includes some or all of the VS audio path information. In block 310, the client device receives and stores the VS audio path information sent by the application server. At this point, both the client device and the voice server have knowledge of the IP address and port to which audio data should be sent to each other. In other words, the voice server knows at which address to send downlink audio data, and the client device knows at which address to send uplink audio data. Accordingly, at this point, a bidirectional audio data path between the voice server and the client device is established. In an alternate embodiment, a one-way audio data path may be established between the voice server and the client device. For example, an audio data path in which only uplink audio data is sent from the client device to the voice server may be established, in which case the client audio path information may not be provided to the voice server. In another embodiment, a push-to-talk (PTT) channel may be established, which enables either the client device or the voice server to send audio data over the VS/client audio data path at any given time.

In block 312, the client device sends a control message to the application server, over the AS/client control path, which includes multi-modal application information. In an embodiment, the multi-modal application information includes information that identifies the multi-modal application that the client device is preparing to execute. In another embodiment, the multi-modal application information includes a reference (e.g., a uniform resource locator (URL)) for at least one multi-modal page (e.g., multi-modal page 115, FIG. 1) and/or for at least one speech dialog (e.g., speech dialog 136, FIG. 1) associated with the multi-modal application that the client device is preparing to execute.

In block 314, the application server receives the multi-modal application information. The application server may then determine, from the multi-modal application information, references (e.g., the URLs) for the at least one multi-modal page and for the at least one speech dialog. In an embodiment, the application server may then send, over the AS/VS control path, the references (e.g., the URL(s)) for the speech dialog to the voice server. The voice server may then download or access the speech dialog(s) corresponding to the references(s). In an alternate embodiment, the application server may fetch the speech dialog(s) based on the reference(s), and may send the speech dialog(s) to the voice server over the AS/VS control path. In addition, the application server may fetch and send, over the AS/client control path, the multi-modal page(s) to the client device.

In block 316, the client device receives and initiates interpretation of the multi-modal page, and renders visual markup included within the multi-modal page on the client device. For example, the client browser or client-side application component may interpret the visual markup included within the multi-modal page, and may display one or more page elements on a display device associated with the client device, in accordance with the visual markup.

Figure 4:
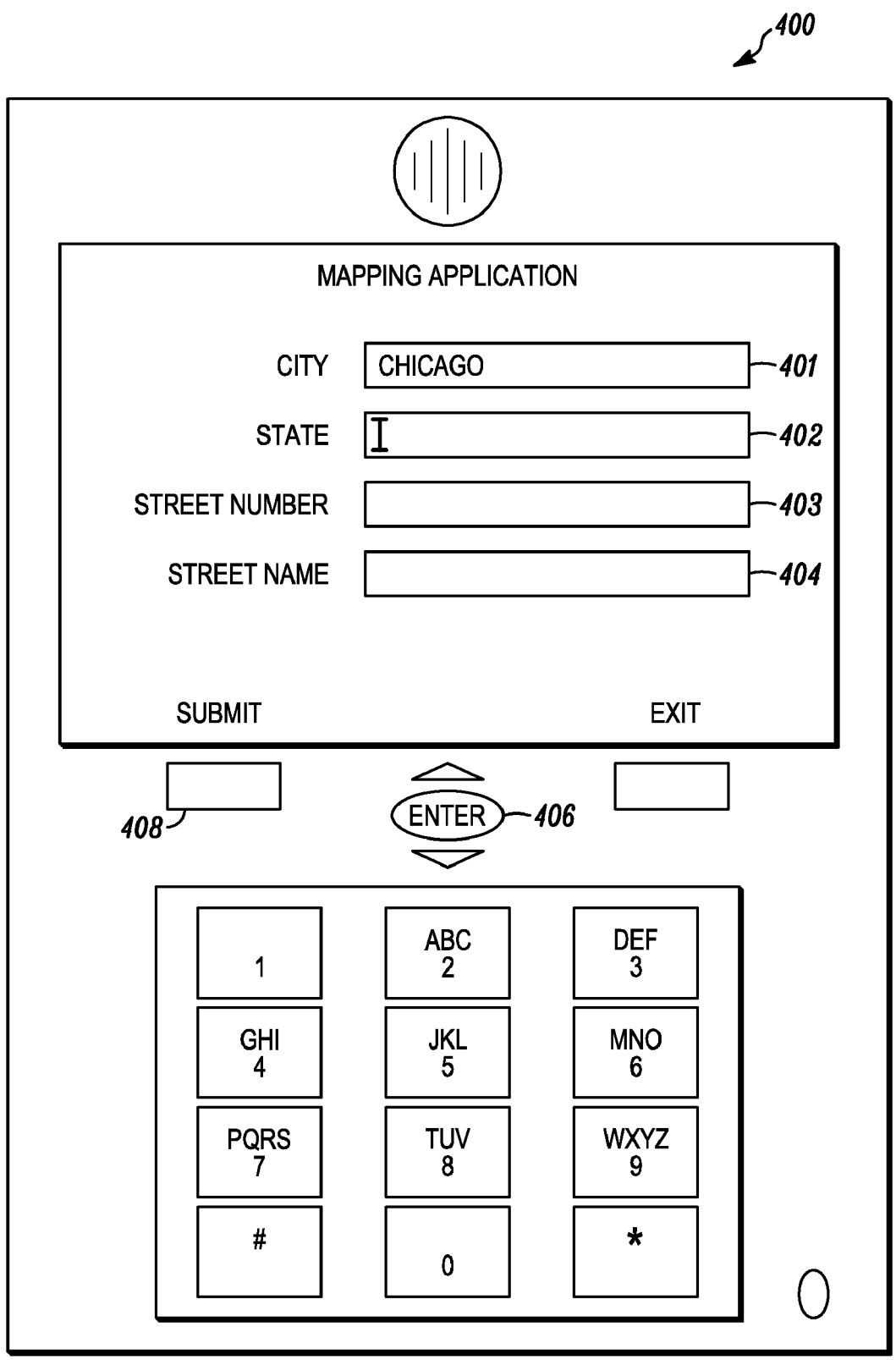
FIG. 4 is an example of visual markup rendered on a client device, in accordance with an example embodiment.

FIG. 4 is an example of visual markup rendered on a client device 400, in accordance with an example embodiment. In the illustrated example, a portion of the visual markup is rendered in the form of four multi-modal display elements 401, 402, 403, 404, each of which includes a textual label (e.g., "CITY", "STATE", "STREET NUMBER", and "STREET NAME") and a data entry field.

Referring again to FIG. 3, in block 318, the client device sends a control message, over AS/client control path, which indicates that the client device has initiated interpretation of the multi-modal page (e.g., the client device has initiated execution of the multi-modal application) and/or has initiated execution of other machine code associated with the multi-modal session. At that point, the visual view is at an initial state. In the initial state of the visual view, the client device may be waiting to receive and digitize an audio signal corresponding to speech and to send uplink audio data over the VS/client audio data path to the voice server corresponding to the digitized audio signal. In addition or alternatively, in the initial state of the visual view, the client device may be waiting to receive additional control messages from the application server, and/or to downlink audio data from the voice server over the VS/client audio data path, and to render the downlink audio data using an audio output device (e.g., a speaker, earphone or headphone) associated with the client device.

In block 320, the application server receives the control message indicating that the client device has initiated interpretation of the multi-modal page or other machine code associated with the multi-modal application session, and the application server sends a control message to the voice server, over the AS/VS control path, which instructs the voice server to begin interpreting the speech dialog. In block 322, the voice server then begins interpreting the speech dialog. At that point, the voice view is at an initial state that is synchronized with the initial state of the visual view. In the initial state of the voice view, the voice server may be waiting to receive additional control messages from the application server, and/ or in which it may be waiting to receive uplink audio data from the client device over the VS/client audio data path.

The process of initializing and starting the multi-modal application session is then completed. At this point, the visual view is in a first state, in which the client device has reached a point, in its interpretation of the machine code associated with the multi-modal session (e.g., the multi-modal page and/or the client-side application component), at which it is waiting for an input from the user via the visual modality or the voice modality, or at which it is waiting for downlink audio data from the voice server. In addition, the voice view is at a first state, in which the voice server has reached a point, in its interpretation of the machine code associated with the multi-modal session (e.g., the speech dialog), at which it is waiting for a control input from the application server or at which it is waiting for uplink audio from the client device.

FIG. 3 illustrates a particular embodiment of a method for performing multi-modal application session initiation. As with the other methods described herein (e.g., in FIGS. 5 and 6), the illustrated sequence of processes may be different from that illustrated and described, some processes and/or messages may be combined together, and/or some processes or messages may be excluded altogether, in other embodiments. For example, in an alternate embodiment of a method for performing multi-modal application session initiation, steps 302 and 312 of FIG. 3 may be combined together (e.g., the client device may send audio path information to the voice server along with the multi-modal application information). In other alternate embodiments, all or portions of process 314 may be excluded, such as when the client device and/or the voice server already has loaded the machine code associated with the multi-modal application session (e.g., making download of the machine code unnecessary). In still another alternate embodiment, the client device and the voice server may communicate directly to establish the VS/client audio data path (e.g., the client device may initiate a call leg to the voice server, and the VS/client audio data path may be established with a session identifier, which is sent to the application server).

As discussed previously in conjunction with blocks 206 and 208 of FIG. 2, after initiation of a multi-modal application session, at least two types of events may occur, which may affect the states of the voice view and/or the visual view. These event types include a VS-generated event and a client-generated event. FIGS. 5 and 6 illustrate embodiments of a VS-generated event handling process and a client-generated event handling process, respectively.

Figure 5:
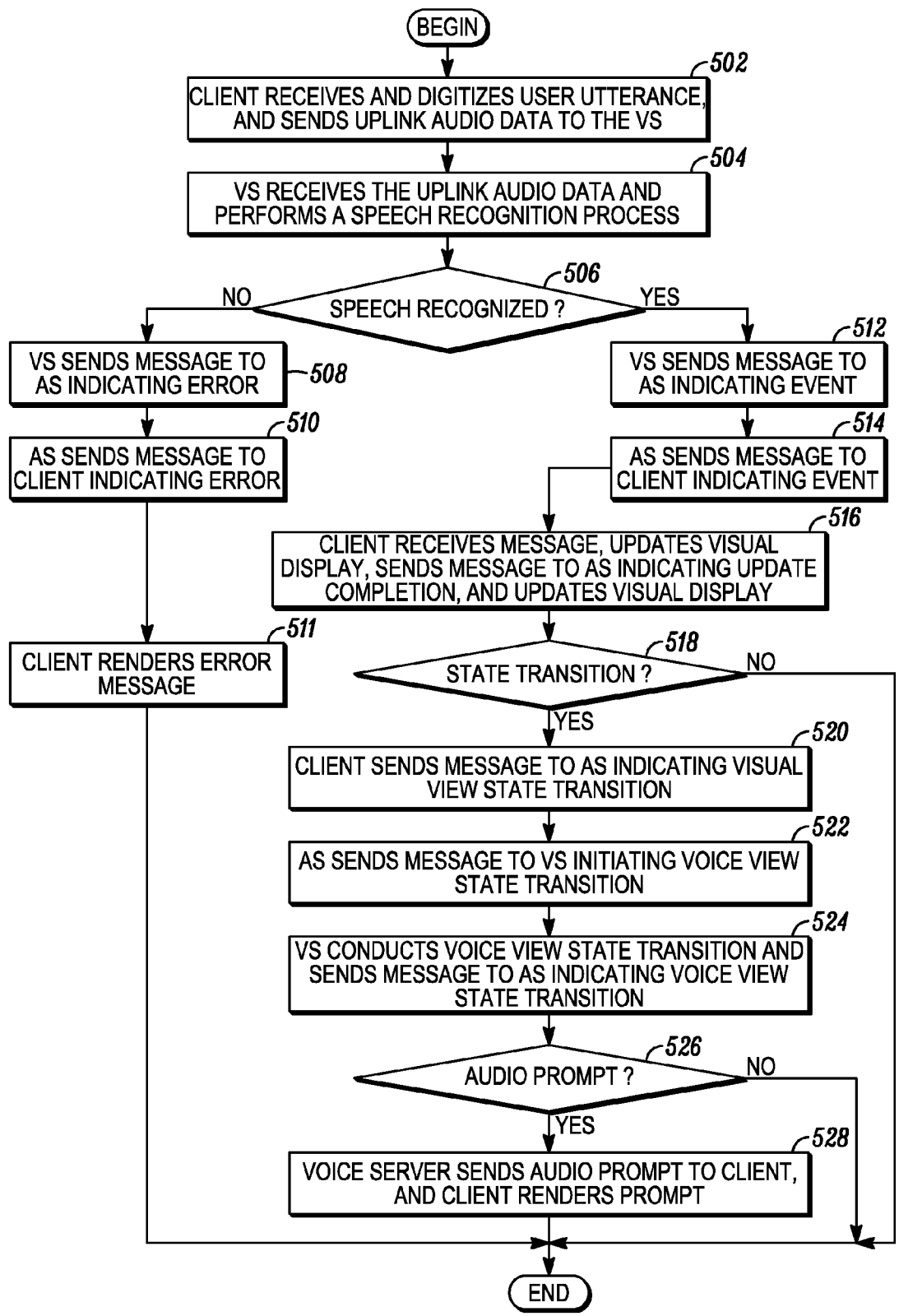
FIG. 5 is a flowchart of a method for performing a voice server-generated event handling process, in accordance with an example embodiment.

FIG. 5 is a flowchart of a method for performing a VS-generated event handling process (e.g., process 206, FIG. 2), in accordance with an example embodiment. The term "VS-generated event" may be defined as an event that occurs on the voice server that may warrant a state change for the voice view. For example, various VS-generated events may include, but are not limited to, a speech recognition event, a timeout event, and downloading or accessing another voice dialog, among other things.

In an embodiment, the method may begin, in block 502, when the client device receives, through its user interface, a signal that may represent a user utterance (e.g., user speech). The client device may then digitize and process the signal to generate uplink audio data that represents the signal, and may send the uplink audio data to the voice server over the audio data path (e.g., VS/client audio data path 124, FIG. 1). The user speech may correspond to a single display element (e.g., the speech may be an utterance of "Illinois" corresponding to display element 402, FIG. 4) or to more than one display element (e.g., the speech may be an utterance of "Chicago, Ill." corresponding to display elements 401 and 402). In various embodiments, the audio data path may be established over a packet-switched or a circuit-switched network. In an embodiment in which the audio data path is established over a packet-switched network, the client device packetizes the audio data, and sends the audio data in one or more messages that are addressed to the voice server IP address and port that the client device received during the multi-modal application session initiation process (e.g., the process of FIG. 3).

In block 504, the voice server receives the uplink audio data. In response to the receipt of the uplink audio data, the voice server may perform a speech recognition process, in which the voice server attempts to recognize speech (e.g., an utterance) represented by the uplink audio data. In an embodiment, this includes processing the uplink audio data by a speech recognizer (e.g., speech recognizer 134, FIG. 1). In an embodiment, the speech recognizer may access a speech recognition resource associated with the then-current state of the voice view, where the speech recognition resource may include data associated with a set of utterances that are associated with the then-current state of the voice view. For example, referring again to FIG. 4, the data "CHICAGO" has been filled into the data entry field for a first display element 401 (e.g., the "CITY" display element). The cursor is shown in the data entry field for a second display element 402 (i.e., the "STATE" display element), which indicates the current focus of the visual view, or the state of the visual view. When the visual view and the voice view are synchronized, the state of the voice view will correspond to the voice server waiting to receive audio data corresponding to a user utterance of the name of a state. Because a finite set of state names exists, the robustness of the speech recognizer may be enhanced when the speech recognizer accesses a speech recognition resource associated with a set of utterances corresponding to the finite set of state names. The speech recognition resource may be adapted to recognize speech with various different pronunciations of the state names and/or data representative of male and female speech characteristics, among other variables.

A determination is made, in block 506, whether speech is recognized. When the voice server is unable to correlate the uplink audio data with recognizable speech (e.g., the audio data does not correspond to any single state name within an acceptable margin of error), the voice server may determine that speech was not recognized. In such a case, in block 508, the voice server may send a control message to the application server, over the AS/VS control path, which indicates that a speech recognition error occurred. In block 510, the application server may then send a control message to the client device, over the AS/client control path, which indicates the error. Upon receipt of the error indication, the client device may render an error message, in block 511, which indicates to the user that the user's input speech was not recognized. The client device may render the error message as an audio prompt and/or as a message displayed on the visual display, in various embodiments. The client device may then prompt the user to re-enter the data or may take some other action (or no action), and the method may end.

Referring again to block 506, when the voice server determines that the uplink audio data corresponds to recognizable speech (e.g., the audio data corresponds to a recognized state name), the voice server may generate a recognition event (e.g., a VS-generated event), in block 512, and may send a control message to the application server, over the AS/VS control path, which informs the application server of the recognition event. In an embodiment, the recognition event includes an indication that the speech was recognized (e.g., a binary value), and the speech recognition result, which may include an indication of the recognized speech (e.g., an indication of the recognized state name). In an alternate embodiment, the recognition event also may include one or more additional speech recognition results, and possibly indications of the correlation strength for each of the speech recognition results (e.g., an indication of the likelihoods that each result is the correct result). An indication of the recognized speech may include a textual representation of the recognized speech, an index into a table of possible recognition results (e.g., a table listing state names), or some other type of indicator, in various embodiments. In block 514, the application server may then send a control message to the client device, over the AS/client control path, which includes information included within or derived from the control message received from the voice server (e.g., a message that indicates the recognition event). For example, the control message also may include an indication that the speech was recognized and the speech recognition result (e.g., an indication of the recognized speech).

Although the receipt and recognition of audio data may trigger the voice server to produce a VS-generated event, in an embodiment, other conditions also may trigger the voice server to produce a VS-generated event, in other embodiments. For example, but not by way of limitation, when the voice view is in a state at which it is waiting for audio data to be received, the voice server may produce a VS-generated event when the audio data is not received within a pre-defined timeout period. In such a case, the VS-to-AS control message sent in block 512 may inform the application server of the other type of event, and the AS-to-client control message sent in block 514 may, in turn, inform the client device of the other type of event. The client device may take action according to the type of event. Although other types of VS-generated events are not discussed in detail herein, the scope of the embodiments is intended to include other types of VS-generated events.

Upon the application server sending the control message to the client device, in block 514, the client device receives the control message, and processes the speech recognition result, in block 516. In addition, the client device updates the visual display according to the speech recognition result, and sends a control message to the application server, over the AS/client control path, to indicate that the update has been completed and/or that the client device is ready to receive another message indicating a VS-generated event. For example, if the speech recognition result is conveyed in some form other than a textual representation of the recognized speech, the client device may determine the textual representation (e.g., the client device may lookup the textual representation when the speech recognition result identifies an entry in a table). Referring again to FIG. 4, for example, if the speech recognition result is processed as the text "ILLINOIS", the client device may display "ILLINOIS" in the data entry field for the second display element 402. When the recognition result corresponds to more than one display element, the client device may display data in more than one corresponding data entry field (e.g., when the recognition result indicates recognized speech of "Chicago" and "Illinois", the client device may display "CHICAGO" in display element 401, if it is not already displayed, and may display "ILLINOIS" in display element 402). In addition, the client device automatically (e.g., without further user interaction) may change the focus of the visual view by moving the cursor to the data entry field for the third display element 403. In the context of changing the focus, the client device may conduct a state change for the visual view by completing its interpretation of the markup associated with the second display element 402, and by initiating interpretation of the markup associated with the third display element 403.

Referring again to FIG. 5, in block 518, the client device determines whether a state transition for the visual view has occurred. For example, a state transition may occur when the focus of the visual view has been changed, as described in the preceding paragraph. When no state transition has occurred, the method may end. When a state transition has occurred, the client device sends a control message to the application server, over the AS/client control path, indicating that the state transition has occurred, in block 520. In alternate embodiments, the information within the control message sent in block 520 may be combined with the information within the control message sent in block 516, and/or the application server may infer either item of information based on the receipt of the other item of information (in other words, when the application server receives the indication of update completion, it may infer that a state transition occurred, or vice versa).

In block 522, the application server receives the information indicating that the state transition has occurred, and sends a control message to the voice server, over the AS/VS control path, which includes information that will cause the voice server to initiate a state transition for the voice view. For example, in an embodiment, the information in the control message may be an instruction from the application server for the voice server to conduct a voice view state transition. In another embodiment, the information in the control message may be an indication that a visual view state transition has occurred, and the voice server may determine whether or not to conduct a voice view state transition, accordingly.

In block 524, the voice server receives the control message from the application server, and in response, conducts the voice view state transition. In addition, the voice server may send a control message to the application server, over the AS/VS control path, which indicates that the state transition has occurred. For example, referring again to FIG. 4, the voice server may complete its interpretation of the machine code associated with waiting for audio data relating to the second display element 402, and may initiate interpretation of the machine code associated with waiting for audio data for the third display element 403 and/or machine code associated with sending downlink audio data (e.g., an audio prompt) to the client device, over the VS/client audio data path.

When a determination is made, in block 526, that the current state of the voice view includes sending an audio prompt to the client device, then in block 528, the voice server sends the appropriate audio prompt to the client device as downlink audio data over the VS/client audio data path. For example, when the focus has been changed to the third display element 403, the machine code associated with the third display element 403 may cause the voice server to send an audio prompt to the client device, over the VS/client audio data path, which includes audio data corresponding to "Please say the street number", or some similar audio prompt. Upon receipt of the audio data, the client device may render the audio prompt, such as by outputting and audible signal corresponding to the prompt on an audio output device of the client device. The method of FIG. 5 may then end.

Embodiments of the method illustrated in FIG. 5 pertain to processes performed when a VS-generated event occurs, which may affect the states of either or both the visual view or the voice view. As discussed previously, a client device also may generate an event, which may affect the states of the visual view and/or the voice view. In such an event, a client-generated event handling process is performed, in an embodiment.

Figure 6:
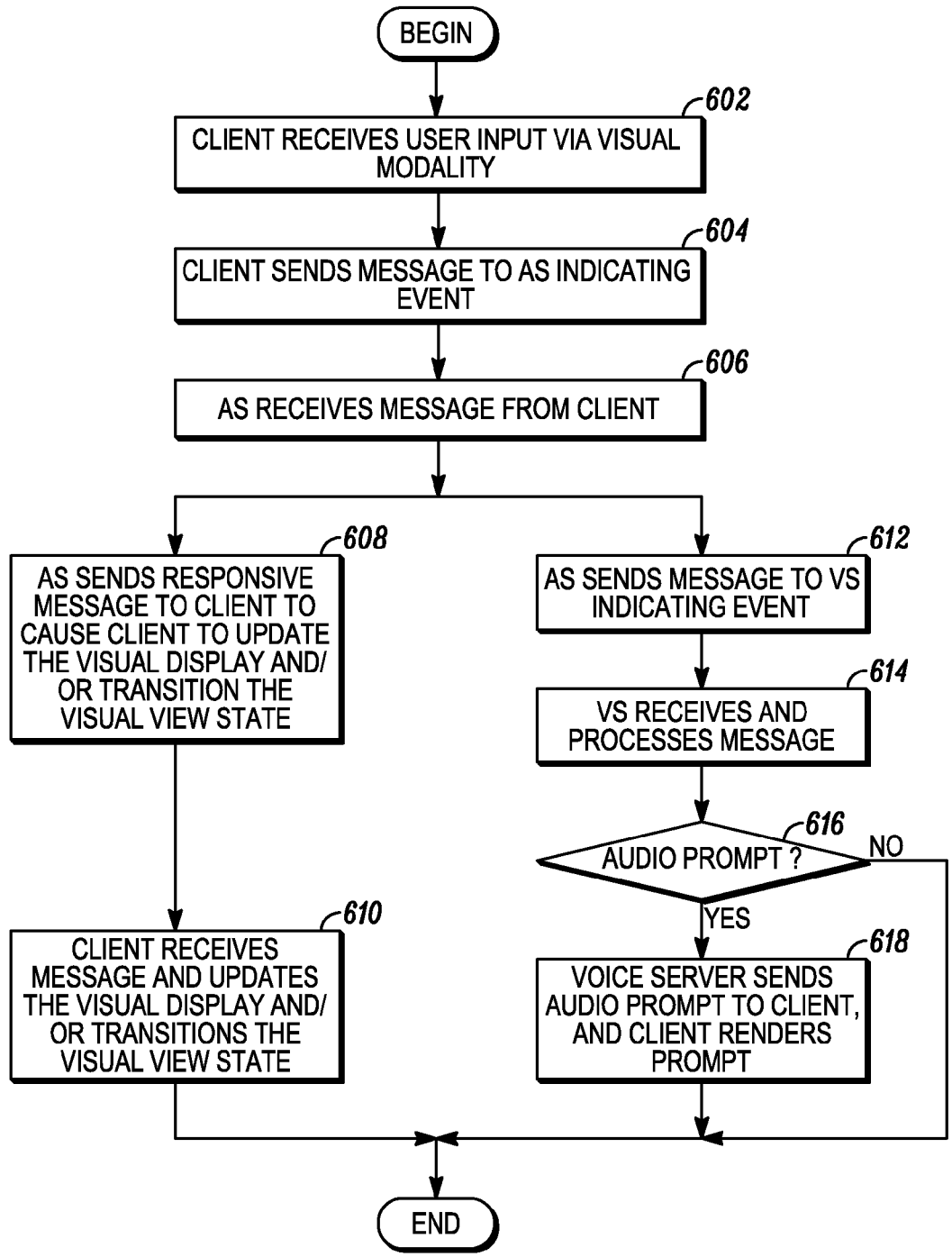
FIG. 6 is a flowchart of a method for performing a client-generated event handling process, in accordance with an example embodiment.

FIG. 6 is a flowchart of a method for performing a client-generated event handling process (e.g., process 208, FIG. 2), in accordance with an example embodiment. The term "client-generated event" may be defined as an event that occurs on the client device that may warrant a state change for the visual view. For example, various client-generated events may include, but are not limited to, a focus change of the visual view, entry of data using the keyboard, and downloading or accessing another multi-modal page, among other things.

In an embodiment, the method may begin, in block 602, when the client device receives, through its visual modality, a user input that may warrant a state change for the visual view and/or an update of the visual display. For example, the user may use a scrolling or pointing mechanism of the client device to select a display element and/or data entry field that is different from that upon which the visual view currently is focused. As another example, the user may cause text to be entered into the data entry field upon which the visual view is currently focused using the keypad, for example, and may indicate completion of information insertion into the data field, such as by pressing an "ENTER" key (e.g., "ENTER" key 406, FIG. 4) or by providing some other indication. As yet another example, the user may cause the client device to request or access another multi-modal page, such as by indicating a navigation to the other multi-modal page through the user interface, or by submitting information included within the current page, such as by pressing a "SUBMIT" key (e.g., "SUBMIT" key 408, FIG. 4) or by providing some other indication.

When the client device receives a user input that may warrant a visual display update and/or visual view state change, the client device may generate a client-generated event, in block 604, and may send a control message to the application server, over the AS/client control path, which informs the application server of the client-generated event. In an embodiment, the client-generated event includes an indication of the type of event (e.g., text entry, a focus change, a multi-modal page change), and an indication of the particulars of the event. For example, referring also to FIG. 4, when the client device has received a text entry of "ILLINOIS" for data entry field 402, the control message may indicate a text entry type of event, and may include an indication of the entered text "ILLINOIS". An indication of the entered text may include a textual representation of the entered data, an index into a table of valid entries (e.g., a table listing state names), or some other type of indicator, in various embodiments. As another example, when the client device has received a user input to change the focus to data entry field 404, the control message may indicate a focus change type of event (e.g., an indication of a change from a current focus on data entry field 403 to a different focus on data entry field 404), and may include information identifying data entry field 404.

In block 606, the application server receives the control message from the client device, and processes the control message as described below. In block 608, the application server generates and sends a responsive control message to the client device, over the AS/client control path, which may include information to cause the client device to update the visual display and/or to transition the visual view to another state. For example, when the client-generated event indicates the entry of text (e.g., the user entered "ILLINOIS" on the keypad and selected "ENTER"), the control message may instruct the client device to change the state of the visual view to correspond to the next sequential data entry field, if there is one, and/or may instruct the client device to update the visual display by moving the cursor into the next sequential data entry field (e.g., to perform a focus change). In an embodiment, if the client-generated event indicates that the client has entered text into a last data entry field, the control message may instruct the client to take some other action (e.g., initiate mapping of the entered information or transition to a new page, for example). When the client-generated event indicates a focus change without entry of text, the control message may instruct the client device to change the state of the visual view to correspond to the user-selected display element (which is not necessarily the next sequential element), and/or may instruct the client device to update the visual display by moving the cursor into the data entry field corresponding to the user-selected display element.

In block 610, the client device receives the control message from the application server, and responds accordingly. For example, the client device may update the visual display by moving the cursor, and/or may transition the state of the visual view to correspond to the display element upon which the visual display currently should be focused. For example, referring also to FIG. 4, when the application server has indicated to the client device that the client device should update the visual display and to transition the state of the visual view, the client may respond by updating the visual display and transitioning the state of the visual view, as instructed. For example, if the client device is instructed to change the focus of the visual view to display element 403, the client device may conduct a state transition for the visual view by completing its interpretation of the machine code associated with the second display element 402 (e.g., waiting for user input via the visual modality or the voice modality for second display element 402, and/or waiting for an audio prompt from the voice server), and by initiating interpretation of the machine code associated with the third display element 403 (e.g., waiting for user input via the visual modality or the voice modality for third display element 403, and/or waiting for an audio prompt from the voice server).

In parallel with, before or after blocks 608 and 610, the application server may send a control message to the voice server, over the AS/VS control path, in block 612, which indicates the client-generated event by including information included in or derived from the control message that the application server received from the client device in block 606. For example, the control message also may include an indication of the type of client-generated event and an indication of the event particulars, as described previously.

In block 614, the voice server receives the control message from the application server, and processes the message, for example, by setting one or more values, identifying an audio prompt, conducting a voice view state change, and/or downloading or accessing another speech dialog, as appropriate. For example, referring also to FIG. 4, when the application server has indicated to the voice server that the client device has received a text entry of "ILLINOIS" for data entry field 402, and that the focus of the visual display has changed to data entry 403, the voice server may store an indication of the entered text for future reference (e.g., in determining speech recognition resources to use during subsequent speech recognition processes), and may change the state of the voice view to be synchronized with the visual view. For example, if the focus of the visual view has changed, the voice server may conduct a state change for the voice view by completing its interpretation of the machine code associated with the second display element 402 (e.g., waiting for audio data relating to the second display element 402 and/or generating audio prompts for the second delay element 402), and by initiating interpretation of the machine code associated with the display element (e.g., the third display element 403) to which the focus has been changed. The machine code associated with the display element to which the focus has been changed may include machine code associated with waiting for audio data for that display element and/or machine code associated with sending downlink audio data to the client device, over the VS/client audio data path, which may include an audio prompt associated with that display element.

When a determination is made, in block 616, that the current state of the voice view includes sending an audio prompt to the client device, then in block 618, the voice server sends the appropriate audio prompt to the client device as downlink audio data over the VS/client audio data path. For example, when the focus has been changed to the third display element 403, the machine code associated with the third display element 403 may cause the voice server to send an audio prompt to the client device, over the VS/client audio data path, which includes audio data corresponding to "Please say the street number", or some similar audio prompt. Upon receipt of the audio data, the client device may render the audio prompt, such as by outputting and audible signal corresponding to the prompt on an audio output device of the client device. In an embodiment, the client device does not render the prompt until the client device has completed block 610. The method of FIG. 6 may then end.

Embodiments of methods and apparatus for implementing distributed multi-modal applications have now been described above. The foregoing detailed description is merely exemplary in nature and is not intended to limit the inventive subject matter or the application and uses of the inventive subject matter to the described embodiments. Furthermore, there is no intention to be bound by any theory presented in the preceding background or detailed description.

An embodiment of a method performed by an application server includes the step of receiving, over an application server/voice server control path between the application server and a voice server, an indication from the voice server that speech has been recognized based on uplink audio data sent from a client device to the voice server over an audio data path between the client device and the voice server. The uplink audio data represents an analog audio signal received through a voice modality of the client device, and the voice server is distinct from the application server. The method also includes the step of sending, over an application server/client control path between the application server and the client device, a message to the client device that includes a recognition result for the speech and that causes the client device to update a visual display to reflect the recognition result.

Another embodiment of a method performed by a client device includes the step of rendering a visual display based on interpretation of machine code that causes the client device to render the visual display, wherein the visual display includes at least one display element for which input data is receivable by the client device though a visual modality and a voice modality. The method also includes the steps of receiving speech through the voice modality, digitizing the speech to generate uplink audio data corresponding to one or more display elements of the at least one display element, and sending the uplink audio data to a voice server over an audio data path between the client device and the voice server. The method also includes the step of receiving a speech recognition result from an application server over an application server/client control path between the application server and the client device, where the speech recognition result is based on the voice server having performed a speech recognition process on the uplink audio data, the audio data path is distinct from the application server/client control path, and the voice server is distinct from the application server. The method also includes updating the one or more display elements of the visual display according to the speech recognition result.

An embodiment of a system includes a client device, a voice server, and an application server. The client device is adapted to display at least one display element for which input data is receivable though a visual modality and a voice modality and, when the input data is received through the voice modality as speech, to send uplink audio data representing the speech to the voice server over an audio data path between the client device and the voice server. The voice server is adapted to determine, based on the uplink audio data, whether the speech is recognized, and when the speech is recognized, to send an indication that the speech is recognized to the application server over an application server/voice server control path between the application server and the voice server. The application server is adapted to receive the indication that the speech was recognized, and based on the indication, to send a speech recognition result to the client device over an application server/client control path between the application server and the client device, where the application server/client control path is distinct from the audio data path.

The sequence of the text in any of the claims does not imply that process steps must be performed in a temporal or logical order according to such sequence unless it is specifically defined by the language of the claim. The process steps may be interchanged in any order, and/or may be performed in parallel, without departing from the scope of the inventive subject matter. In addition, it is to be understood that information within the various different messages, which are described above as being exchanged between the system elements, may be combined together into single messages, and/or the information within a particular message may be separated into multiple messages. Further, messages may be sent by system elements in sequences that are different from the sequences described above. Furthermore, words such as "connected" or "coupled to" used in describing a relationship between different elements do not imply that a direct physical connection must be made between these elements. For example, two elements may be connected to each other physically, electronically, logically, or in any other manner, through one or more additional elements, without departing from the scope of the inventive subject matter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled technicians may implement the described functionality in varying ways for each particular application, but such implementation decisions should not be interpreted as causing a departure from the scope of the inventive subject matter.

The various illustrative logical blocks and modules described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in one or more software modules executed by a processor, or in a combination of the two. A software module may reside in random access memory, flash memory, read only memory (ROM), erasable programmable ROM (EPROM), electrical EPROM, registers, hard disk, a removable disk, a compact disc ROM (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter, it being understood that various changes may be made in the function and arrangement of elements described in an exemplary embodiment without departing from the scope of the inventive subject matter as set forth in the appended claims and their legal equivalents.

What is claimed is:

1. A method performed by an application server, the method comprising the steps of:
   receiving, over an application server/voice server control path between the application server and a voice server, an indication from the voice server that speech has been recognized based on uplink audio data sent from a client device to the voice server over an audio data path between the client device and the voice server, wherein the uplink audio data represents a user utterance received through a voice modality of the client device, and wherein the voice server is distinct from the application server; and
   sending, over an application server/client control path between the application server and the client device that is distinct from the audio data path, a message to the client device that includes a recognition result for the speech and that causes the client device to update a visual display to reflect the recognition result.

2. The method of claim 1, further comprising the step of:
   establishing the audio data path by
   receiving client audio path information from the client device over the application server/client control path, wherein the client audio path information includes address information for the voice server to send downlink audio data to the client device over the audio data path;
   receiving voice server audio path information from the voice server over the application server/voice server control path, wherein the voice server audio path information includes address information for the client device to send the uplink audio data to the voice server over the audio data path;
   sending the client audio path information to the voice server over the application server/voice server control path; and
   sending the voice server audio path information to the client device over the application server/client control path.

3. The method of claim 1, further comprising:
   sending a multi-modal page to the client device over the application server/client control path, wherein the multi-modal page, when interpreted, causes the client device to render the visual display that includes at least one display element for which input data is receivable by the client device though a visual modality and the voice modality.

4. The method of claim 1, further comprising sending a reference to a speech dialog to the voice server over the application server/voice server control path.

5. The method of claim 1, further comprising sending a speech dialog to the voice server over the application server/voice server control path.

6. The method of claim 1, further comprising the steps of:
   receiving an indication from the client device, over the application server/client control path, that the client device has initiated interpretation of machine code that causes the client device to render the visual display that includes at least one display element for which input data is receivable by the client device though a visual modality and the voice modality; and
   sending an instruction to the voice server, over the application server/voice server control path, for the voice server to begin interpreting a speech dialog associated with the machine code being interpreted by the client device.

7. The method of claim 1, further comprising the steps of:
   receiving an indication from the client device, over the application server/client control path, that the client device has updated the visual display according to the recognition result; and
   sending a message to the voice server, over the application server/voice server control path, to indicate that the client device has updated the visual display.

8. The method of claim 1, further comprising the steps of:
   receiving an indication from the client device, over the application server/client control path, that a current focus within the visual display rendered on the client device has changed to a different focus, wherein the different focus indicates a display element of the visual display for which input data currently is receivable by the client device though a visual modality and a voice modality; and
   sending a message to the voice server, over the application server/voice server control path, which includes information that will cause the voice server to execute machine code corresponding to the different focus.

9. The method of claim 1, further comprising the steps of:
   receiving an indication from the client device, over the application server/client control path, that a client-generated event has occurred which warrants an update to the visual display rendered on the client device;
   sending information to the client device, over the application server/client control path, to cause the client device to update the visual display based on the client-generated event; and
   sending an instruction to the voice server, over the application server/voice server control path, which includes information that indicates the client-generated event.

10. A method performed by a client device, the method comprising the steps of:
    rendering a visual display based on interpretation of machine code that causes the client device to render the visual display, wherein the visual display includes at least one display element for which input data is receivable by the client device though a visual modality and a voice modality;

receiving a signal representing a user utterance through the voice modality;

digitizing the signal to generate uplink audio data corresponding to one or more display elements of the at least one display element;

sending the uplink audio data to a voice server over an audio data path between the client device and the voice server;

receiving a speech recognition result from an application server over an application server/client control path between the application server and the client device, wherein the speech recognition result is based on the voice server having performed a speech recognition process on the uplink audio data, and wherein the audio data path is distinct from the application server/client control path, and wherein the voice server is distinct from the application server; and updating the one or more display elements of the visual display according to the speech recognition result.

11. The method of claim 10, further comprising:
receiving a multi-modal page from the application server over the application server/client control path, wherein the multi-modal page includes the machine code, and wherein rendering the visual display is performed by interpreting machine code in the form of markup within the multi-modal page.

12. The method of claim 10, further comprising:
receiving downlink audio data from the voice server over the audio data path, wherein the downlink audio data includes an audio prompt; and
rendering the audio prompt on an audio output device of the client device.

13. The method of claim 10, further comprising:
sending client audio path information to the application server over the application server/client control path, wherein the client audio path information includes address information for the voice server to send downlink audio data to the client device over the audio data path; and
receiving voice server audio path information from the application server over the application server/client control path, wherein the voice server audio path information includes address information for the client device to send the uplink audio data to the voice server over the audio data path.

14. The method of claim 10, further comprising:
receiving a user input that warrants an update to the visual display rendered on the client device;
based on receiving the user input, sending an indication to the application server, over the application server/client control path, that a client-generated event has occurred; and
receiving information from the application server, over the application server/client control path, which causes the client device to update the visual display based on the client-generated event.

15. The method of claim 14, wherein receiving the user input comprises:
receiving an indication that the user has selected another display element that is different from a display element upon which the visual view currently is focused.

16. The method of claim 10, further comprising:
receiving an indication that the user has entered text into a data entry field for one or more display elements using a keypad of the client device.

17. A system comprising:
a client device adapted to display at least one display element for which input data is receivable though a visual modality and a voice modality and, when the input data is received through the voice modality as speech, to send uplink audio data representing the speech to a voice server over an audio data path between the client device and the voice server;
the voice server adapted to determine, based on the uplink audio data, whether the speech is recognized, and when the speech is recognized, to send an indication that the speech is recognized to an application server over an application server/voice server control path between the application server and the voice server; and
the application server adapted to receive the indication that the speech was recognized, and based on the indication, to send a speech recognition result to the client device over an application server/client control path between the application server and the client device, wherein the application server/client control path is distinct from the audio data path.

18. The system of claim 17, wherein the application server is further adapted to receive first audio path information from the client device over the application server/client control path and to receive second audio path information from the voice server over the application server/voice server control path, wherein the first audio path information includes a client internet protocol (IP) address to be used for downlink audio data sent to the client device from the voice server over the audio data path, and wherein the second audio path information includes a voice server IP address to be used for the uplink audio data sent to the voice server from the client device over the audio data path, and wherein the application server is further adapted to initiate establishment of the audio data path by sending the first audio path information to the voice server over the application server/voice server control path, and by sending the second audio path information to the client device over the application server/client control path.

19. The system of claim 17, wherein the client device is a device selected from a group of devices that includes a cellular telephone, a radio, a pager, a personal data assistant, a personal navigation device, a mobile computer system, an automotive computer system, an airplane computer system, a compute, a laptop computer, a notebook computer, a desktop computer, and a voice over internet protocol (VoIP) phone implemented on a computer.

20. The system of claim 17, wherein the application server and the voice server are distinct from each other in that the application server and the voice server perform distinct processes, and exchange control messages that affect performance of the distinct processes over the application server/voice server control path.

* * * * *